(12) United States Patent
Lee et al.

(10) Patent No.: US 8,416,323 B2
(45) Date of Patent: Apr. 9, 2013

(54) NOISE REDUCTION METHOD AND NOISE REDUCTION APPARATUS

(75) Inventors: Wei-Kuo Lee, Hsinchu County (TW); Yun-Hung Shen, Hsinchu (TW); Ji-Wei Wan, Taoyuan County (TW)

(73) Assignee: Mstar Semiconductor Inc., Hsinchu County (TW)

( * ) Notice: Subject to any disclaimer, the term of this patent is extended or adjusted under 35 U.S.C. 154(b) by 646 days.

(21) Appl. No.: 12/552,078

(22) Filed: Sep. 1, 2009

(65) Prior Publication Data

US 2009/0316023 A1 Dec. 24, 2009

Related U.S. Application Data

(63) Continuation-in-part of application No. 11/433,446, filed on May 15, 2006, now abandoned.

(60) Provisional application No. 60/682,407, filed on May 19, 2005.

(51) Int. Cl.
*H04N 5/217* (2011.01)

(52) U.S. Cl.
USPC .......................................................... 348/241

(58) Field of Classification Search .................. 348/241, 348/243, 248, 251, 222.1, 234, 162
See application file for complete search history.

(56) References Cited

U.S. PATENT DOCUMENTS

| 4,953,011 | A | 8/1990 | Mori et al. |
| 5,012,329 | A * | 4/1991 | Lang et al. ................... 348/667 |
| 5,264,944 | A | 11/1993 | Takemura |
| 5,905,531 | A * | 5/1999 | Chiba .......................... 348/241 |
| 7,015,961 | B2 * | 3/2006 | Kakarala ....................... 348/246 |
| 7,084,906 | B2 * | 8/2006 | Adams et al. .............. 348/222.1 |
| 7,136,581 | B2 | 11/2006 | Fujii |
| 7,181,084 | B2 | 2/2007 | Jostschulte |
| 7,483,082 | B2 * | 1/2009 | Chou ............................ 348/645 |
| 7,576,891 | B2 * | 8/2009 | Hwang ......................... 358/1.9 |
| 7,633,555 | B2 * | 12/2009 | Yang et al. .................... 348/577 |
| 2005/0122408 | A1 | 6/2005 | Park et al. |
| 2006/0078225 | A1 | 4/2006 | Pearson et al. |

* cited by examiner

*Primary Examiner* — Chieh M Fan
*Assistant Examiner* — Fayez Bhuiyan
(74) *Attorney, Agent, or Firm* — WPAT PC; Justin King (57) ABSTRACT

The present invention provides a noise reduction method and apparatus for use in reducing noise of a digital image. The noise reduction apparatus comprises a threshold value generating unit, a determining unit, and an adjusting unit. The threshold value generating unit generates a noise threshold value according to a target window and a first chrominance value and a second chrominance value of an input pixel of the image. The determining unit determines whether the input pixel needs to be adjusted according to the noise threshold value and pixel values of neighboring pixels of the input pixel. The adjusting unit adjusts the pixel value of the input pixel when the input pixel is determined as needing to be adjusted. Using the noise reduction apparatus of the present invention, not only noise of a digital image can be identified, but also the degradation caused by the noise can be reduced and thus the overall picture quality can be improved.

12 Claims, 7 Drawing Sheets

| luminance index / 2 | 0 | 1 | 2 | 3 | 4 | 5 | 6 | 7 | 8 | 9 | 10 | 11 | 12 | 13 | 14 | 15 | 16 | 17 | 18 | ... |
|---|---|---|---|---|---|---|---|---|---|---|---|---|---|---|---|---|---|---|---|---|
| | 0 | 1 | 2 | 3 | 4 | 5 | 6 | 7 | 8 | 9 | 10 | 11 | 12 | 13 | 14 | 15 | 15 | 15 | 15 | ... |
| Weighting Value | 0 | 16 | 16 | 16 | 16 | 16 | 16 | 16 | 16 | 16 | 16 | 16 | 16 | 16 | 16 | 16 | 16 | 16 | 16 | ... |

NOISE REDUCTION METHOD AND NOISE REDUCTION APPARATUS

BACKGROUND OF THE INVENTION

1. Field of the Invention

The present invention generally relates to a noise reduction method and a noise reduction apparatus and, more particularly, to a noise reduction method and a noise reduction apparatus using the luminance value and the chrominance values of an input pixel so as to identify and eliminate a noise point of a digital image by adjusting the luminance value and the chrominance values.

2. Description of the Prior Art

In digital image processing, the most generally used method to reduce noise is to directly process the pixels related to the image. For example, averaging filters and sequence statistical filters are used according to respective requirements.

Conventionally, mosquito noise and Gaussian noise are eliminated using a lowpass filter, operating corresponding to the pixel values in a masked region by the filter so as to obtain a mean value and then make the mean value replace the pixel values. However, the lowpass filter performs pixel adjustment for the entire image including some non-noise portions. Therefore, the noise reduction process using the lowpass filter may lead to undesirable distortion of the image because it cannot identify where noise occurs. Moreover, since the pixel is adjusted according to the pixel values of the neighboring pixels, the adjusted image shows unnaturalness in luminance and chrominance.

Accordingly, the present invention provides a noise reduction method not only to identify noise of a digital image, but also to reduce noise by adjusting the luminance value and the chrominance values to avoid image distortion.

Compared to the prior art, the noise reduction method of the present invention exhibits excellent performance in noise reduction while remaining the original colors in the region where there is no noise determined.

SUMMARY OF THE INVENTION

It is a primary object of the present invention to provide a noise reduction method and a noise reduction apparatus so as to identify noise in a digital image and adjust the luminance value and the chrominance values of a pixel that is determined a noise point so that the image quality is improved and the image distortion is avoided.

In order to achieve the foregoing object, the present invention provides a noise reduction method, comprising steps of: defining a target window by a first chrominance range and a second chrominance range; determining a noise threshold value according to whether an input pixel of the image is located inside the target window by a threshold value generating unit; determining whether a pixel value of the input pixel needs to be adjusted according to the noise threshold value and pixel values of neighboring pixels of the input pixel by a determining unit; and adjusting the pixel value of the input pixel by an adjusting unit when the input pixel is determined as needing to be adjusted.

Preferably, a noise weighting calculation is performed according to the shortest distance between the target window and the input pixel so as to determine the noise threshold value if the input pixel having the first chrominance value and the second chrominance value is located inside the target window.

In order to achieve the foregoing object, the present invention further provides a noise reduction apparatus, comprising a threshold value generating unit, for generating a noise threshold value according to a target window and a first chrominance value and a second chrominance value of an input pixel of the image; a determining unit, for determining whether the input pixel needs to be adjusted according to the noise threshold value and pixel values of neighboring pixels of the input pixel; and an adjusting unit, adjusting the pixel value of the input pixel when the input pixel is determined as needing to be adjusted.

Accordingly, the present invention provides a noise reduction method using the first chrominance and the second chrominance values of an input pixel to select a noise threshold value and determine whether the input pixel is infected with noise, which is to be eliminated by adjusting the luminance value or the color value of the input pixel.

BRIEF DESCRIPTION OF THE DRAWINGS

The objects, spirits and advantages of the preferred embodiments of the present invention will be readily understood by the accompanying drawings and detailed descriptions, wherein.

DETAILED DESCRIPTION OF THE PREFERRED EMBODIMENT

The present invention providing a noise reduction method and apparatus for use in an image processing device can be exemplified by the preferred embodiments as described hereinafter.

Figure 1:
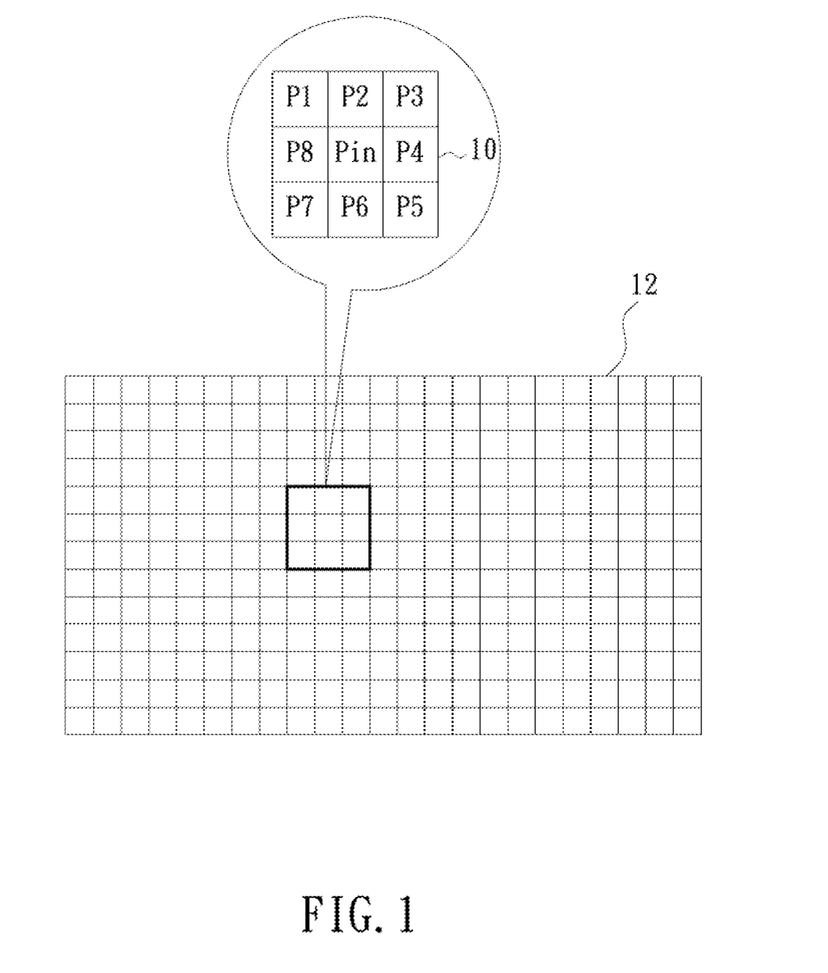
FIG. 1 is a schematic diagram showing an input pixel and its neighboring pixels according to the preferred embodiment of the present invention.

Please refer to FIG. 1, which is a schematic diagram showing an input pixel and its neighboring pixels of an image according to the preferred embodiment of the present invention. A 3×3 mask 10 comprises an input pixel Pin and its neighboring pixels P1, P2, P3, P4, P5, P6, P7, P8. When the input pixel Pin moves from one point in a digital image 12 to another, the mask 10 also moves. The mask 10 can also be implemented by using a 5×5 mask or a 7×7 mask.

Figure 2:
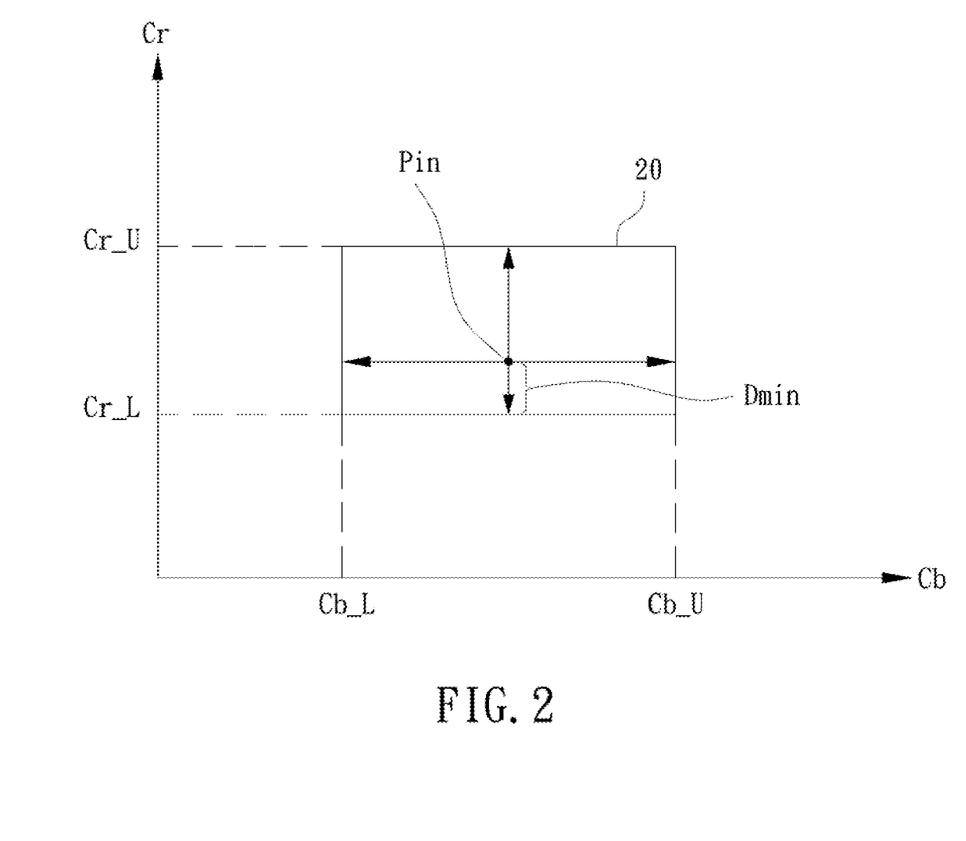
FIG. 2 is a schematic diagram showing an input pixel and a corresponding target window according to the preferred embodiment of the present invention.

Please refer to FIG. 2, which is a schematic diagram showing an input pixel and a corresponding target window according to the preferred embodiment of the present invention. A target window 20 is established on a coordinate plane defined by the first chrominance Cb and the second chrominance Cr as the horizontal axis and the vertical axis. The target window 20 is a rectangular window, wherein Cb_U, Cb_L, Cr_U and Cr_L are determined by the user. There exists a shortest distance Dmin between the target window 20 and the input pixel Pin if the input pixel Pin having the first chrominance value Cb and the second chrominance value Cr is located inside the target window 20.

Figure 3:
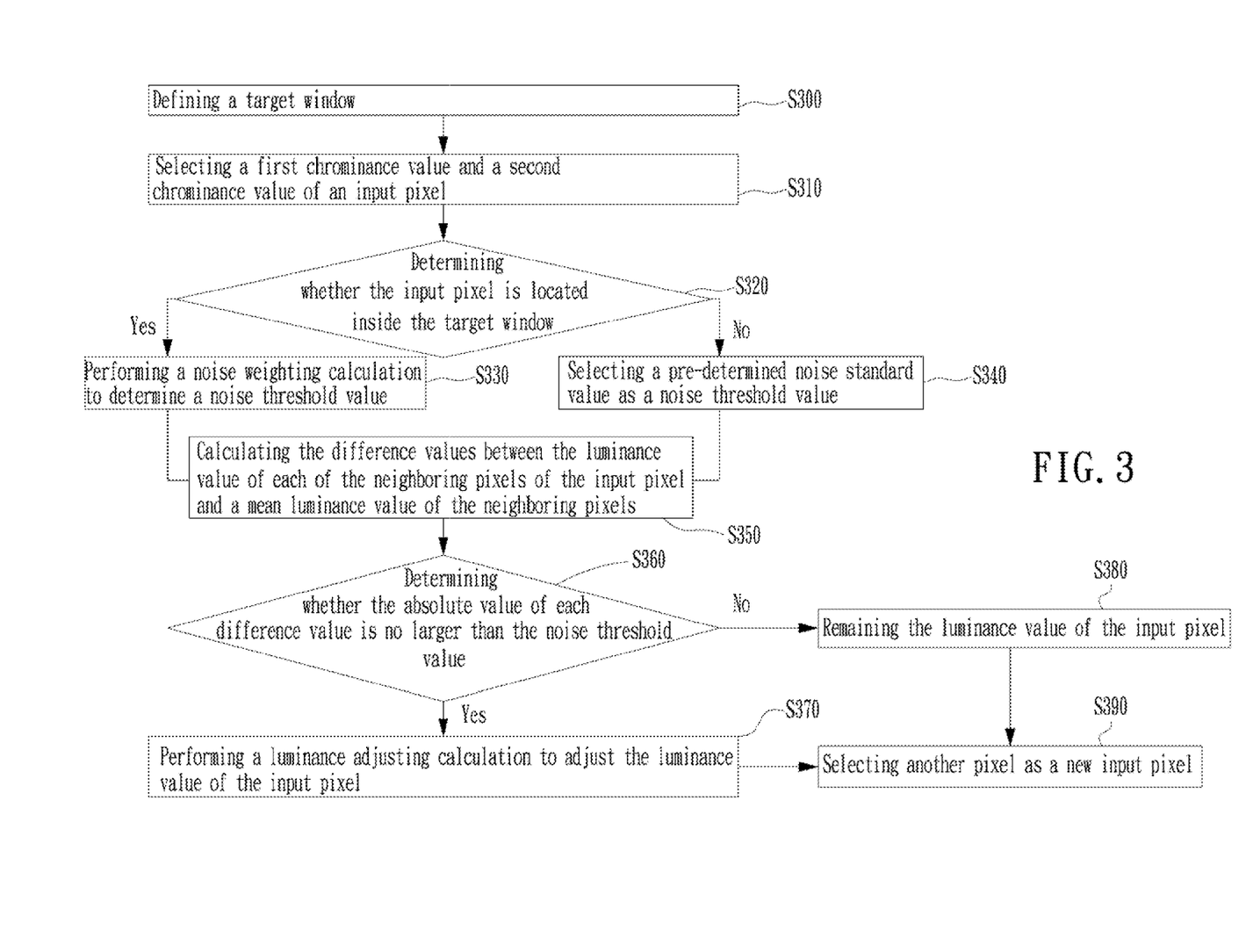
FIG. 3 is a flowchart showing steps of the noise reduction method according to the preferred embodiment of the present invention.
Figure 7:
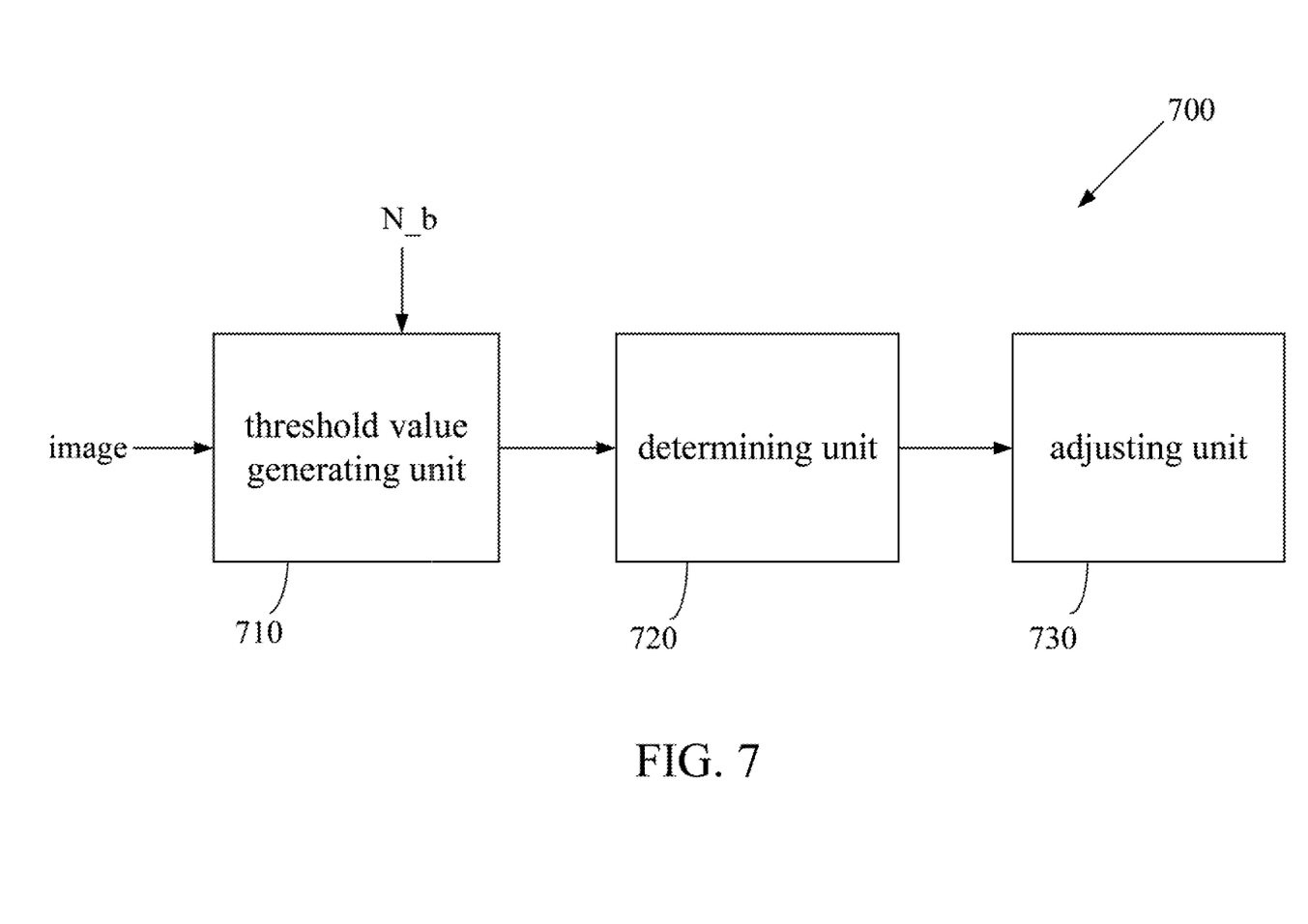
FIG. 7 shows a noise reduction apparatus according to one of embodiments of the present invention.

FIG. 7 shows a noise reduction apparatus according to one of embodiments of the present invention. The noise reduction apparatus comprises a threshold value generating unit 710, a determining unit 720 and an adjusting unit 730. The threshold value generating unit 710 is used for generating a noise threshold value according to a target window and a first chrominance value and a second chrominance value of an input pixel of an image. The determining unit 720 is used to determine whether the input pixel needs to be adjusted according to the noise threshold value and pixel values of the input pixel and its neighboring pixels. The adjusting unit 730 is used to adjust the input pixel. FIG. 3 is a flowchart showing steps of the noise reduction method according to the preferred embodiment of the present invention. Referring to FIGS. 3 and 7, the detailed description of the preferred embodiment is described as following. First, as described in Step S300, a target window is defined on a coordinate plane defined by the first chrominance and the second chrominance as the horizontal axis and the vertical axis. In Step S310, a first chrominance value and a second chrominance value of an input pixel of an image are selected. Then in Step S320, whether the input pixel having the first chrominance value and the second chrominance value is located inside the target window is determined by the threshold value generating unit 710.

In Step S330, the threshold value generating unit 710 performs a noise weighting calculation to determine a noise threshold value when the input pixel having the first chrominance value and the second chrominance value is located inside the target window; otherwise, the threshold value generating unit 710 selects a pre-determined noise standard value N_b as a noise threshold value when the input pixel is not located inside the target window, as described in Step S340. The noise weighting calculation is expressed as:

$$N\_th = N\_b - W1 \times Dmin$$

wherein N_th is the noise threshold value, N_b is the pre-determined noise standard value, W1 is a first weighting value and Dmin is the shortest distance between the target window and the input pixel.

After the noise threshold value is determined, the difference values between the luminance value of each of the neighboring pixels of the input pixel and a mean luminance value of the neighboring pixels are calculated by the determining unit 720 so as to obtain a set of luminance difference values, as described in Step S350. In Step S360, whether the absolute value of each difference value is not larger than the noise threshold value is determining by the determining unit 720. In Step S370, a luminance adjusting calculation is performed by the adjusting unit 730 to adjust the luminance value of the input pixel if the absolute value of each difference value is not larger than the noise threshold value; otherwise, the luminance value of the input pixel is remained if the absolute value of any difference value is larger than the noise threshold value, as described in Step S380. The luminance adjusting calculation is expressed as:

$$Yin\_new = (1 - W2) \times Yin + W2 \times Y\_mean$$

wherein Yin_new is an adjusted luminance value of the input pixel, Yin is the luminance value of the input pixel, W2 is a second weighting value and Y_mean is a mean luminance value of the neighboring pixels of the input pixel.

After either Step S370 or Step S380 is completed, another pixel is selected as a new input pixel, as described in Step S390.

Figure 4:
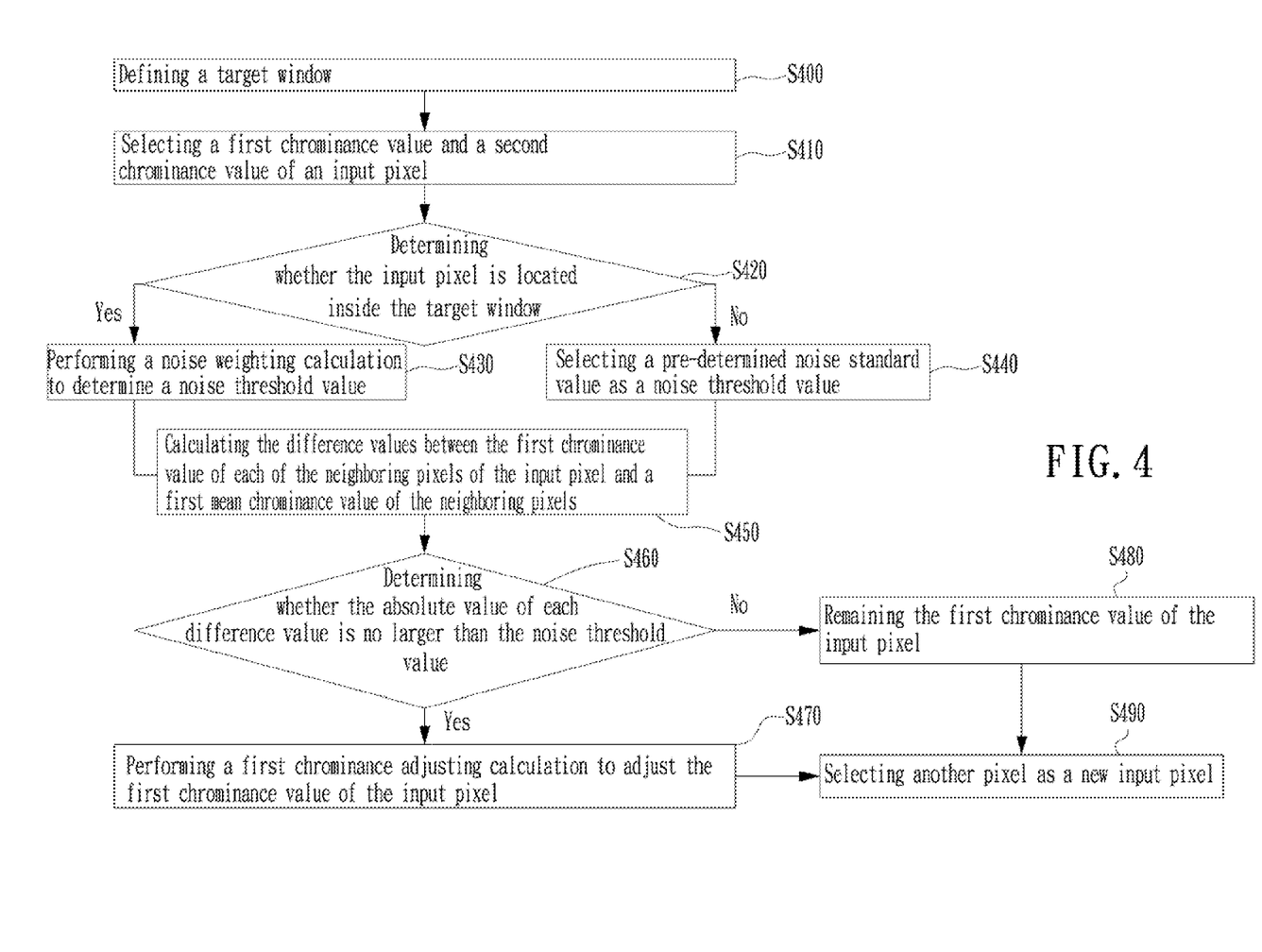
FIG. 4 is a flowchart showing steps for adjusting the first chrominance value in the noise reduction method according to another preferred embodiment of the present invention.

Please further refer to FIG. 4, which is a flowchart showing steps for adjusting the first chrominance value in the noise reduction method according to another preferred embodiment of the present invention. Step S400 to Step 440 are identical to Step S300 to Step 340. Step S450 to Step S480 are used for adjusting the first chrominance value, as described hereinafter.

In Step S450, the difference values between the first chrominance value of each of the neighboring pixels of the input pixel and a first mean chrominance value of the neighboring pixels are calculated by the determining unit 720 so as to obtain a set of first chrominance difference values, as described in Step S450. In Step S460, whether the absolute value of each difference value is not larger than the noise threshold value is determining by the determining unit 720. In Step S470, a first chrominance adjusting calculation is performed by the adjusting unit 730 to adjust the first chrominance value of the input pixel if the absolute value of each difference value is not larger than the noise threshold value; otherwise, the first chrominance value of the input pixel is remained if the absolute value of any difference value is larger than the noise threshold value, as described in Step S480. The first chrominance adjusting calculation is expressed as:

$$Cbin\_new = (1 - W3) \times Cbin + W3 \times Cb\_mean$$

wherein Cbin_new is an adjusted chrominance value of the input pixel, Cbin is the chrominance value of the input pixel, W3 is a weighting value and Cb_mean is a mean chrominance value of the neighboring pixels of the input pixel.

After either Step S470 or Step S480 is completed, another pixel is selected as a new input pixel, as described in Step S490.

Figure 5:
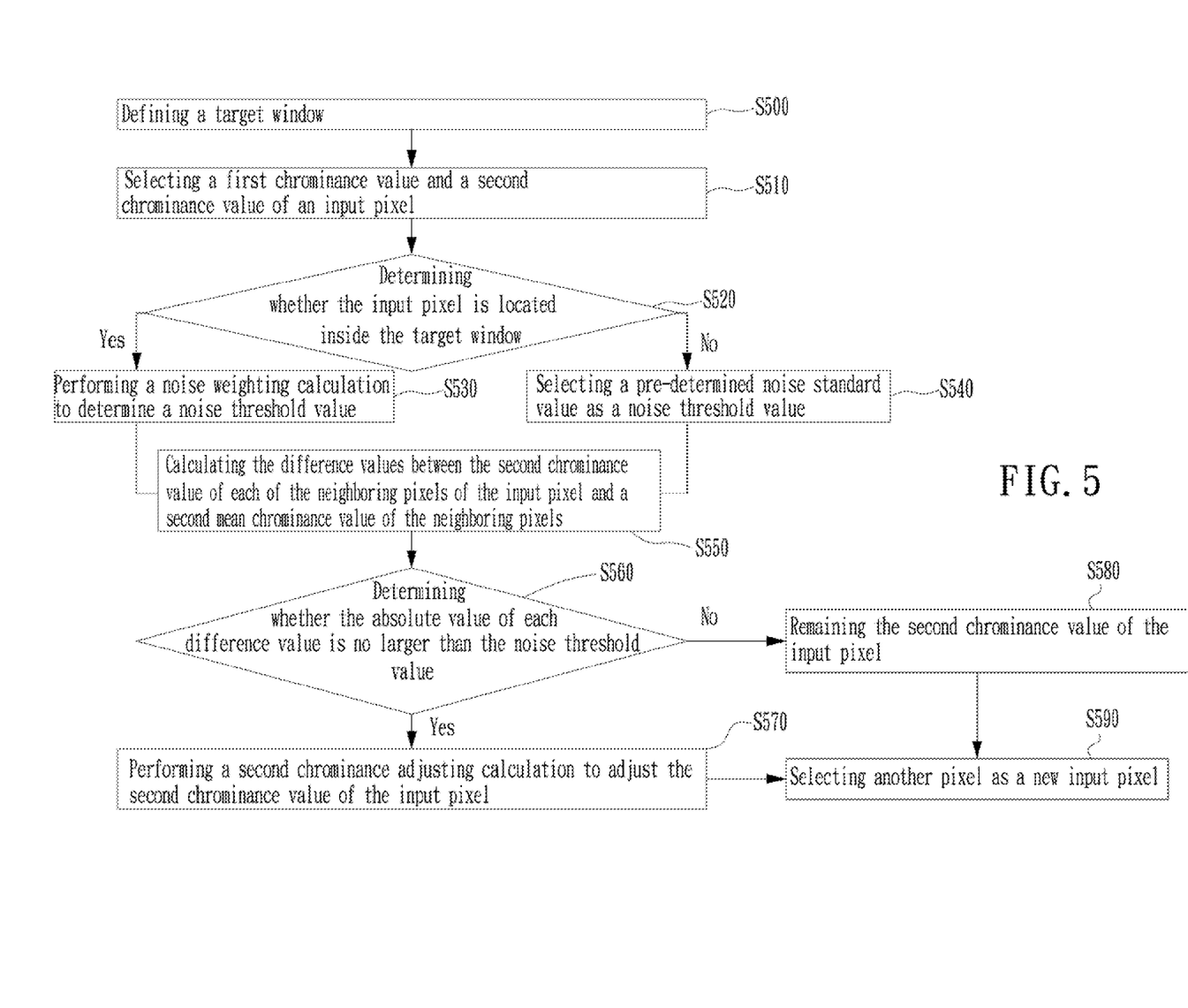
FIG. 5 is a flowchart showing steps for adjusting the second chrominance value in the noise reduction method according to another preferred embodiment of the present invention.

Please further refer to FIG. 5, which is a flowchart showing steps for adjusting the second chrominance value in the noise reduction method according to another preferred embodiment of the present invention. Step S500 to Step 540 are identical to Step S300 to Step 340. Step S550 to Step S580 are used for adjusting the second chrominance value, as described hereinafter.

In Step S550, the difference values between the second chrominance value of each of the neighboring pixels of the input pixel and a second mean chrominance value of the neighboring pixels are calculated by the determining unit 720 so as to obtain a set of second chrominance difference values, as described in Step S550. In Step S560, whether the absolute value of each difference value is not larger than the noise threshold value is determining by the determining unit 720. In Step S570, a second chrominance adjusting calculation is performed by the adjusting unit 730 to adjust the second chrominance value of the input pixel if the absolute value of each difference value is not larger than the noise threshold value; otherwise, the second chrominance value of the input pixel is remained if the absolute value of any difference value is larger than the noise threshold value, as described in Step S580. The second chrominance adjusting calculation is expressed as:

$$Crin\_new = (1 - W4) \times Crin + W4 \times Cr\_mean$$

wherein Crin_new is an adjusted chrominance value of the input pixel, Crin is the chrominance value of the input pixel, W4 is a weighting value and Cr_mean is a mean chrominance value of the neighboring pixels of the input pixel.

After either Step S570 or Step S580 is completed, another pixel is selected as a new input pixel, as described in Step S590.

Figure 6:
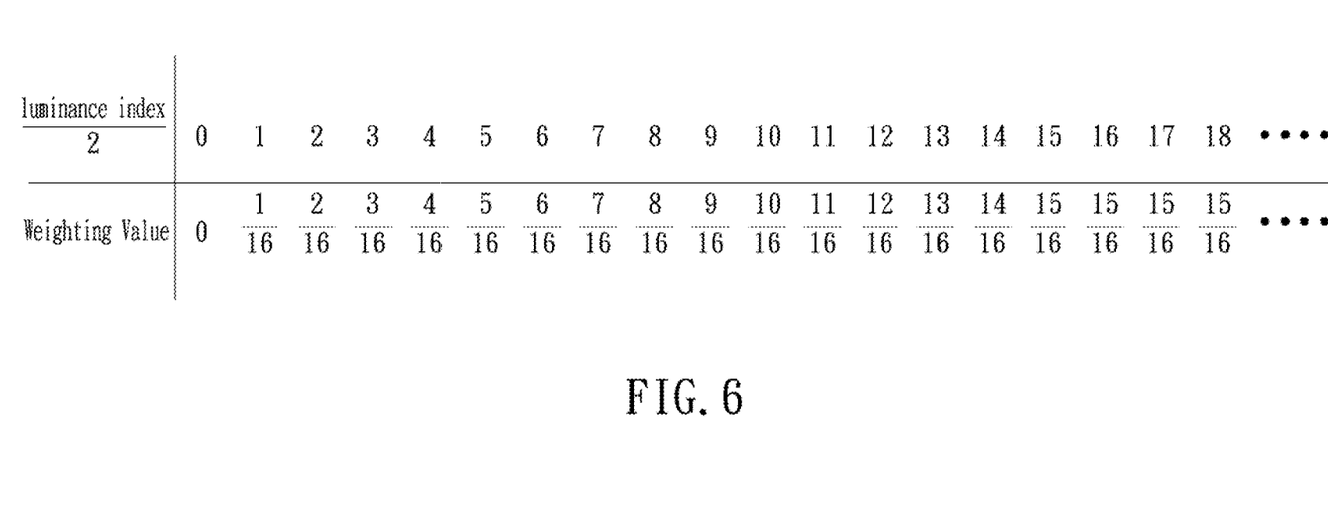
FIG. 6 is a lookup table used in the noise reduction method according to the present invention.

The aforesaid weighting values W2, W3, W4 are selected according to a luminance index, a first chrominance index, a second chrominance index and a corresponding lookup table. The luminance index is expressed as:

$$Y\_index = abs[Y1-Y\_mean] + abs[Y2-Y\_mean] +$$
$$abs[Y3-Y\_mean] + abs[Y4-Y\_mean] + abs[Y5-Y\_mean] +$$
$$abs[Y6-Y\_mean] + abs[Y7-Y\_mean] + abs[Y8-Y\_mean]$$

wherein Y_index is the luminance index, Y1, Y2, Y3, Y4, Y5, Y6, Y7, Y8 are the luminance values of the neighboring pixels of the input pixel, and abs[ ] is an absolute value operator.

The first chrominance index is expressed as:

$$Cb\_index = abs[Cb1-Cb\_mean] + abs[Cb2-Cb\_mean] +$$
$$abs[Cb3-Cb\_mean] + abs[Cb4-Cb\_mean] + abs[Cb5-Cb\_mean] +$$
$$abs[Cb6-Cb\_mean] + abs[Cb7-Cb\_mean] + abs[Cb8-Cb\_mean]$$

wherein Cb_index is the first chrominance index, Cb1, Cb2, Cb3, Cb4, Cb5, Cb6, Cb7, Cb8 are the chrominance values of the neighboring pixels of the input pixel, and abs[ ] is an absolute value operator.

The second chrominance index is expressed as:

$$Cr\_index = abs[Cr1-Cr\_mean] + abs[Cr2-Cr\_mean] +$$
$$abs[Cr3-Cr\_mean] + abs[Cr4-Cr\_mean] + abs[Cr5-Cr\_mean] +$$
$$abs[Cr6-Cr\_mean] + abs[Cr7-Cr\_mean] + abs[Cr8-Cr\_mean]$$

wherein Cr_index is the second chrominance index, Cr1, Cr2, Cr3, Cr4, Cr5, Cr6, Cr7, Cr8 are the chrominance values of the neighboring pixels of the input pixel, and abs[ ] is an absolute value operator.

For example, in FIG. 6, when half of the luminance index is 2, W2 is set to be 2/16. Similarly, W3 and W4 can also be obtained by using the lookup table.

According to the above discussion, it is apparent that the present invention discloses a noise reduction method and a noise reduction apparatus so as to identify noise in a digital image and adjust the luminance value and the chrominance values of a pixel that is determined a noise point so that the image quality is improved and the image distortion is avoided.

Although this invention has been disclosed and illustrated with reference to particular embodiments, the principles involved are susceptible for use in numerous other embodiments that will be apparent to persons skilled in the art. This invention is, therefore, to be limited only as indicated by the scope of the appended claims.

What is claimed is:

1. A noise reduction method for use in an image processing device to reduce noise of an image, the method comprising steps of:

defining a target window having dimensions defined by a first chrominance range and a second chrominance range, respectively;

determining a noise threshold value according to whether an input pixel of the image is located inside the target window by a threshold value generating unit;

determining whether a pixel value of the input pixel needs to be adjusted according to the noise threshold value and pixel values of neighboring pixels of the input pixel by a determining unit; and adjusting the pixel value of the input pixel by an adjusting unit when the input pixel is determined as needing to be adjusted;

wherein the step of adjusting the pixel value of the input pixel when the input pixel is determined as needing to be adjusted comprises performing an adjusting calculation based on the pixel value of the input pixel and the mean pixel value of the neighboring pixels of the input pixel, and the adjusting calculation is expressed as:

$$Pin\_new=(1-W2)\times Pin+W2\times P\_mean$$

wherein Pin_new is an adjusted pixel value of the input pixel, Pin is the pixel value of the input pixel, W2 is a second weighting value and P_mean is a mean pixel value of the neighboring pixels of the input pixel.

2. The noise reduction method as recited in claim 1, further comprising a step of:

performing a noise weighting calculation according to a lowest difference between boundaries of the target window and the input pixel so as to determine the noise threshold value when the input pixel is located inside the target window.

3. The noise reduction method as recited in claim 2, wherein the noise weighting calculation is expressed as:

$$N\_th=N\_b-W1\times Dmin$$

wherein N_th is the noise threshold value, N_b is a pre-determined noise value, W1 is a first weighting value and Dmin is the lowest difference between boundaries of the target window and the input pixel.

4. The noise reduction method as recited in claim 1, wherein a pre-determined noise value is selected as the noise threshold value when the input pixel is located outside the target window.

5. The noise reduction method as recited in claim 1, wherein the step of determining whether a pixel value of the input pixel needs to be adjusted according to the noise threshold value and pixel values of neighboring pixels of the input pixel comprises steps of:

obtaining pixel difference values by calculating difference values between the pixel value of each the neighboring pixels and a mean pixel value of the neighboring pixels; and determining whether the input pixel needs to be adjusted based on comparisons between the absolute value of each the pixel difference values and the noise threshold value.

6. The noise reduction method as recited in claim 1, wherein the second weighting value is selected from a lookup table.

7. The noise reduction method as recited in claim 1, wherein the pixel value of the input pixel is a luminance value of the input pixel, and each the pixel values of the neighboring pixels is a luminance value of the corresponding neighboring pixel.

8. The noise reduction method as recited in claim 1, wherein the pixel value of the input pixel is a first chrominance value of the input pixel, and each the pixel values of the neighboring pixels is a first chrominance value of the corresponding neighboring pixel.

9. The noise reduction method as recited in claim 1, wherein the pixel value of the input pixel is a second chrominance value of the input pixel, and each the pixel values of the neighboring pixels is a second chrominance value of the corresponding neighboring pixel.

10. A noise reduction apparatus for reducing noise of an image, comprising:
- a threshold value generating unit, for generating a noise threshold value according to a target window defined by a range of first chrominance values and a range of second chrominance values, and a first chrominance value and a second chrominance value of an input pixel of the image;
- a determining unit, for determining whether the input pixel needs to be adjusted according to the noise threshold value and pixel values of neighboring pixels of the input pixel; and
- an adjusting unit, adjusting the pixel value of the input pixel when the input pixel is determined as needing to be adjusted;

wherein the threshold value generating unit performs a noise weighting calculation according to a lowest difference between boundaries of the target window and the input pixel so as to determine the noise threshold value when the input pixel is located inside the target window, and the noise weighting calculation is expressed as:

$$N\_th = N\_b - W1 \times D\mathrm{min}$$

wherein $N\_th$ is the noise threshold value, $N\_b$ is a pre-determined noise value, $W1$ is a first weighting value and $D\mathrm{min}$ is the lowest difference between boundaries of the target window and the input pixel.

11. The noise reduction apparatus as recited in claim 10, wherein a pre-determined noise value is selected as the noise threshold value when the input pixel is located outside the target window.

12. The noise reduction apparatus as recited in claim 10, wherein the adjusting unit adjusts the pixel value of the input pixel based on the pixel value of the input pixel and the mean pixel value of the neighboring pixels of the input pixel.

* * * * *